US011630302B1

(12) United States Patent
Weiss et al.

(10) Patent No.: US 11,630,302 B1
(45) Date of Patent: Apr. 18, 2023

(54) DRIVING GUIDANCE SYSTEM FOR A MOTOR VEHICLE HAVING AN AUGMENTED REALITY HEAD UP DISPLAY

(71) Applicant: GM Global Technology Operations LLC, Detroit, MI (US)

(72) Inventors: John P. Weiss, Shelby Township, MI (US); Joseph F. Szczerba, Grand Blanc, MI (US); Thomas A. Seder, Fraser, MI (US); Kai-Han Chang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/714,418

(22) Filed: Apr. 6, 2022

(51) Int. Cl.
| | | |
|---|---|---|
| *B60W 30/095* | (2012.01) | |
| *B60W 30/08* | (2012.01) | |
| *G02B 27/01* | (2006.01) | |
| *G09G 3/00* | (2006.01) | |
| *G06F 3/01* | (2006.01) | |
| *G06V 20/56* | (2022.01) | |

(Continued)

(52) U.S. Cl.
CPC .......... *G02B 27/0101* (2013.01); *B60K 35/00* (2013.01); *G06F 3/013* (2013.01); *G06V 20/58* (2022.01); *G06V 20/588* (2022.01); *G09G 3/002* (2013.01); *B60K 2370/1529* (2019.05); *B60K 2370/167* (2019.05); *B60K 2370/168* (2019.05); *B60K 2370/177* (2019.05); *B60K 2370/21* (2019.05); *G02B 2027/014* (2013.01); *G02B 2027/0138* (2013.01); *G02B 2027/0141* (2013.01); *G09G 2354/00* (2013.01); *G09G 2380/10* (2013.01)

(58) Field of Classification Search
CPC ..................................................... B60K 35/00
See application file for complete search history.

(56) References Cited

U.S. PATENT DOCUMENTS

| | | |
|---|---|---|
| 9,057,874 B2 | 6/2015 | Seder et al. |
| 10,747,314 B1 | 8/2020 | Chang et al. |
| 10,860,093 B1 | 12/2020 | Chang et al. |

(Continued)

OTHER PUBLICATIONS

U.S. Appl. No. 17/813,794, filed Jul. 20, 2022, Kai-Han Chang.
U.S. Appl. No. 17/714,410, filed Apr. 6, 2022, John P. Weiss.
U.S. Appl. No. 17/813,781, filed Jul. 20, 2022, Manoj Sharma.

*Primary Examiner* — Nan-Ying Yang
(74) *Attorney, Agent, or Firm* — Vivacqua Crane, PLLC (57) ABSTRACT

A driving guidance system is provided for a motor vehicle having a windshield. The system includes an input device for generating an input signal associated with the movement of the motor vehicle, a road detection module for generating a road signal associated with a road geometry, and an ARHUD for generating a plurality of images upon the windshield. The system further includes a computer having a processor and a non-transitory computer readable medium storing instructions, such that the processor is programmed to receive the input signal and the road signal. The processor is further programmed to determine a predicted trajectory and a recommended trajectory of the motor vehicle along the road geometry based on the input signal and the road signal. The ARHUD is configured to generate the images upon the windshield and overlaid onto the road geometry to notify the driver of the predicted trajectory and the recommended trajectory.

20 Claims, 4 Drawing Sheets

(51) Int. Cl.
    *G06V 20/58*     (2022.01)
    *B60K 35/00*     (2006.01)

(56)     References Cited

U.S. PATENT DOCUMENTS

| | | |
|---|---|---|
| 10,880,529 B2 | 12/2020 | Chang et al. |
| 10,926,638 B1 | 2/2021 | Chang et al. |
| 11,024,056 B2 | 6/2021 | Chang et al. |
| 11,106,044 B2 | 8/2021 | Seder et al. |
| 11,135,881 B2 | 10/2021 | Hall et al. |
| 2010/0164702 A1 | 7/2010 | Sasaki et al. |
| 2014/0362195 A1* | 12/2014 | Ng-Thow-Hing ..... G06V 40/20 348/51 |
| 2016/0059855 A1* | 3/2016 | Rebhan ............. B60W 30/0956 701/41 |
| 2019/0233034 A1* | 8/2019 | Viele ..................... B62D 59/04 |
| 2020/0355512 A1 | 11/2020 | Cho |
| 2022/0044032 A1 | 2/2022 | Baltaxe et al. |
| 2022/0066211 A1 | 3/2022 | Seder et al. |

\* cited by examiner

DRIVING GUIDANCE SYSTEM FOR A MOTOR VEHICLE HAVING AN AUGMENTED REALITY HEAD UP DISPLAY

INTRODUCTION

The present disclosure relates to a driving guidance system for a motor vehicle, and more particularly to a driving guidance system having an Augmented Reality Head Up Display (ARHUD) for displaying images upon a windshield where a predicted trajectory and a recommended trajectory of the motor vehicle are overlaid onto road geometry visible through the windshield.

Due to their size and weight, vehicles pulling trailers can be challenging to operate in traffic. More specifically, off-tracking occurs when a Longer Combination Vehicle (LCV), such as a tractor trailer, makes a turn or negotiates a ramp, and the rear wheels of the trailer travel along a different path than the towing vehicle and the front wheels of the trailer. This condition can happen where there is not enough space for the driver to make a wide turn that prevents off-tracking, such as turning on city streets or narrow highway entrance and exit ramp curves. Trailers that off-track can run over curbs when turning to the right and encroach oncoming traffic lanes when turning to the left.

Drivers must drive below a predetermined speed to carefully make their turns and/or timely stop if it seems they will collide into other vehicles, curbs, or roadside safety barriers. The truck driver must yield to other traffic when it appears that the truck cannot make its turn without driving into the path of oncoming cars, or onto the sidewalk, and give those vehicles and individuals the ability to move out of the way. When drivers do not timely stop the vehicle, there may be a collision between the trailer and the other vehicle, the curb, or the roadside safety barrier.

A Collision Avoidance System (CAS), also known as a pre-crash system, forward driving guidance system, or collision mitigation system, is an Advanced Driver Assistance System (ADAS) that prevents or decreases the severity of a collision. The CAS monitors a vehicle's speed, the speed of the vehicle in front of it, and the distance between the vehicles, so that the CAS can provide a warning to the driver if the vehicles get too close to one another, potentially helping to avoid a collision. Various technologies and sensors include radar, lidar, and cameras to detect an imminent collision. However, existing CASes do not notify drivers of a predicted trajectory of the vehicle, a recommended trajectory of the vehicle, or provide visible alerts that are overlaid directly onto road geometry and associated with the collision.

Thus, while existing CASes and processes of motor vehicles may achieve their intended purpose, there is a need for a new and improved system and process that address these issues.

SUMMARY

According to several aspects of the present disclosure, a driving guidance system is provided for a motor vehicle having a windshield. The system includes one or more input devices for generating an input signal associated with the movement of the motor vehicle. The system further includes a road detection module for generating a road signal associated with a road geometry, which is visible through the windshield and located within a field of view of a driver of the motor vehicle. The system further includes an Augmented Reality Head Up Display (ARHUD) for generating multiple images upon the windshield and overlaid onto the road geometry. The system further includes a computer having one or more processors electrically communicating with the input device, the road detection module, and the ARHUD. The computer further includes a non-transitory computer readable storage medium storing instructions, such that the processor is programmed to receive the input signal from the input device and the road signal from the road detection module. The processor is further programmed to determine a predicted trajectory of the motor vehicle along the road geometry based on the input signal and the road signal. The processor is further programmed to determine a recommended trajectory of the motor vehicle along the road geometry based on the input signal and the road signal, with the recommended trajectory being separate from the predicted trajectory. The processor is further programmed to generate an actuation signal based on the predicted trajectory and the recommended trajectory of the motor vehicle. The ARHUD is configured to generate the images upon the windshield and overlaid onto the road geometry to notify the driver of the predicted trajectory and the recommended trajectory, in response to the ARHUD receiving the actuation signal from the processor.

In one aspect, the processor is further programmed to generate the actuation signal, in response to the input device including an activation device electrically communicating with the processor, and the activation device being operated by the driver to generate an activation signal received by the processor. The processor can be further programmed to generate the actuation signal, in response to the input device including a GPS network generating a route signal associated with a GPS route having a road curvature, and the processor determining that the motor vehicle is approaching the road curvature. The processor can be further programmed to generate the actuation signal, in response to the processor determining that a difference between the predicted geometry and the recommended trajectory is above a predetermined trajectory threshold.

In another aspect, the images associated with the predicted trajectory include a first color, and the images associated with the recommended trajectory include a second color that is different from the first color.

In another aspect, the input device further includes a wheel speed sensor for generating a speed signal indicative of a current speed of the motor vehicle. The processor is further programmed to determine in real time the predicted trajectory of the motor vehicle, in response to the processor receiving the speed signal from the wheel speed sensor.

In another aspect, the processor is further programmed to determine the predicted trajectory, in response to the processor determining that the current speed of the motor vehicle is above a predetermined speed threshold. The predetermined speed threshold is associated with a braking distance of the motor vehicle, the road geometry, and a weight of the motor vehicle.

In another aspect, the input device further includes a steering angle sensor for generating a wheel angle signal indicative of a current wheel angle of the motor vehicle. The processor is further programmed to determine in real time the predicted trajectory, in response to the processor receiving the wheel angle signal from the steering angle sensor.

In another aspect, the processor is further programmed to determine the predicted trajectory, in response to the processor determining that the current wheel angle is above a predetermined angle threshold. The predetermined angle threshold is associated with the braking distance of the motor vehicle, the road geometry, and the weight of the motor vehicle.

In another aspect, the input device further includes a GPS network for generating a location signal indicative of a current location of the motor vehicle. The processor determines the predicted trajectory, the recommended trajectory, and the recommended speed, in response to the processor receiving the location signal from the GPS network.

In another aspect, the input device further includes a road database, an externally-facing camera, a radar device, a lidar device, a night-vision camera, an infrared camera, an ultrasonic device, an accelerometer, an inclinometer, a V2X network, a Wi-Fi network, a DSRC network, a cellular network, an Internet network, and/or a Human Machine Interface (HMI). The processor further determines the predicted trajectory and/or the recommended trajectory, in response to the processor receiving the input signal from the road database, the externally-facing camera, the radar device, the lidar device, the night-vision camera, the infrared camera, the ultrasonic device, the accelerometer, the inclinometer, the V2X network, the Wi-Fi network, the DSRC network, the cellular network, the Internet network, and/or the HMI.

In another aspect, the processor is further programed to determine a lateral acceleration rating of the motor vehicle, a road geometry, and/or a braking distance, in response to the processor receiving the input signal from the input device. The processor is further programmed to determine the recommended trajectory and the recommended speed based on the lateral acceleration rating, the road geometry, the braking distance, the current speed, the current wheel angle, the current location, and/or a location of another vehicle on the road geometry.

In another aspect, the road geometry includes a lane geometry, a roadside safety barrier, and/or a land elevation. The processor is further programed to determine a predicted collision of the motor vehicle at a predicted collision time, which is associated with the predicted trajectory and based the lane geometry, the roadside safety barrier, and/or the land elevation.

In another aspect, the ARHUD is configured to generate the images upon the windshield at a predetermined amount of time before the predicted collision time.

In another aspect, the images include a notification symbol having a color, a size, and/or a symbol associated with at least one of the predicted trajectory, the recommended trajectory, and the recommended speed.

In another aspect, in response to the processor determining that the predicted collision time is decreasing, the ARHUD projects the images onto the windshield such that: the color of the notification symbol incrementally increases in a brightness value; the color of the notification symbol incrementally increases in a saturation value; and/or the size of the notification symbol incrementally increases.

In another aspect, the images include a notification symbol, and the ARHUD is further configured to display information regarding the notification symbol within a near-field image plane of the windshield.

In another aspect, the system further includes an eye tracker electrically communicating with the processor and generating a user signal associated with a location of an eye of the driver. The ARHUD projects the notification symbol on a portion of a far-field image plane of the windshield where the notification symbol is overlaid onto the road geometry that is visible to the driver.

According to several aspects of the present disclosure, a motor vehicle includes a towing vehicle having a windshield. The motor vehicle further includes a trailer, which is connected to the towing vehicle and moved by the towing vehicle. The motor vehicle further includes a driving guidance system having one or more input devices for generating an input signal associated with the movement of the motor vehicle. The system further includes a road detection module for generating a road signal associated with a road geometry, which is visible through the windshield and located within a field of view of a driver of the motor vehicle. The system further includes an Augmented Reality Head Up Display (ARHUD) for generating multiple images upon the windshield and overlaid onto the road geometry. The system further includes a computer including one or more processors electrically communicating with the input device, the road detection module, and the ARHUD. The computer further includes a non-transitory computer readable storage medium storing instructions, such that the processor is programmed to receive the input signal from the input device and the road signal from the road detection module. The processor is further programmed to determine a predicted trajectory of the motor vehicle along the road geometry based on the input signal and the road signal. The processor is further programmed to determine a recommended trajectory of the motor vehicle along the road geometry based on the input signal and the road signal, with the recommended trajectory being separate from the predicted trajectory. The processor is further programmed to generate an actuation signal based on the predicted trajectory and the recommended trajectory of the motor vehicle. The ARHUD is configured to generate the images upon the windshield and overlaid onto the road geometry to notify the driver of the predicted trajectory and the recommended trajectory, in response to the ARHUD receiving the actuation signal from the processor.

In one aspect, the input device includes a Human Machine Interface (HMI) electrically connected to the processor and receiving data associated with a vehicle wheel base of the towing vehicle, a vehicle weight of the towing vehicle, a trailer wheel base of the trailer, and/or a trailer weight of the trailer. The processor is further programmed to determine the predicted trajectory and the recommended trajectory based on the vehicle wheel base of the towing vehicle, the vehicle weight of the towing vehicle, the trailer wheel base of the trailer, and/or the trailer weight of the trailer.

According to several aspects of the present disclosure, a process is provided for operating a driving guidance system of a motor vehicle having a windshield. The system has one or more input devices, a road detection module, an Augmented Reality Head Up Display (ARHUD), and a computer including one or more processors and a non-transitory computer readable storage medium storing instructions. The process includes generating, using the input device, an input signal associated with the movement of the motor vehicle. The process further includes generating, using the road detection module, a road signal associated with a road geometry that is visible through the windshield and located within a field of view of a driver of the motor vehicle. The process further includes generating, using the ARHUD, multiple images upon the windshield and overlaid onto the road geometry. The process further includes receiving, with the processor, the input signal from the input device and the road signal from the road detection module. The process further includes determining, using the processor, a predicted trajectory of the motor vehicle along the road geometry based on the input signal and the road signal. The process further includes determining, using the processor, a recommended trajectory of the motor vehicle along the road geometry based on the input signal and the road signal, with the recommended trajectory being separate from the predicted trajectory. The process further includes generating, using the processor, an actuation signal based on the predicted trajectory and the recommended trajectory of the motor vehicle. The process further includes generating, using the ARHUD, the images upon the windshield and overlaid onto the road geometry to notify the driver of the predicted trajectory and the recommended trajectory, in response to the ARHUD receiving the actuation signal from the processor.

In one aspect, the process further includes displaying, using the ARHUD, information regarding the notification symbol within a near-field image plane and/or a far-field image plane of the windshield.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
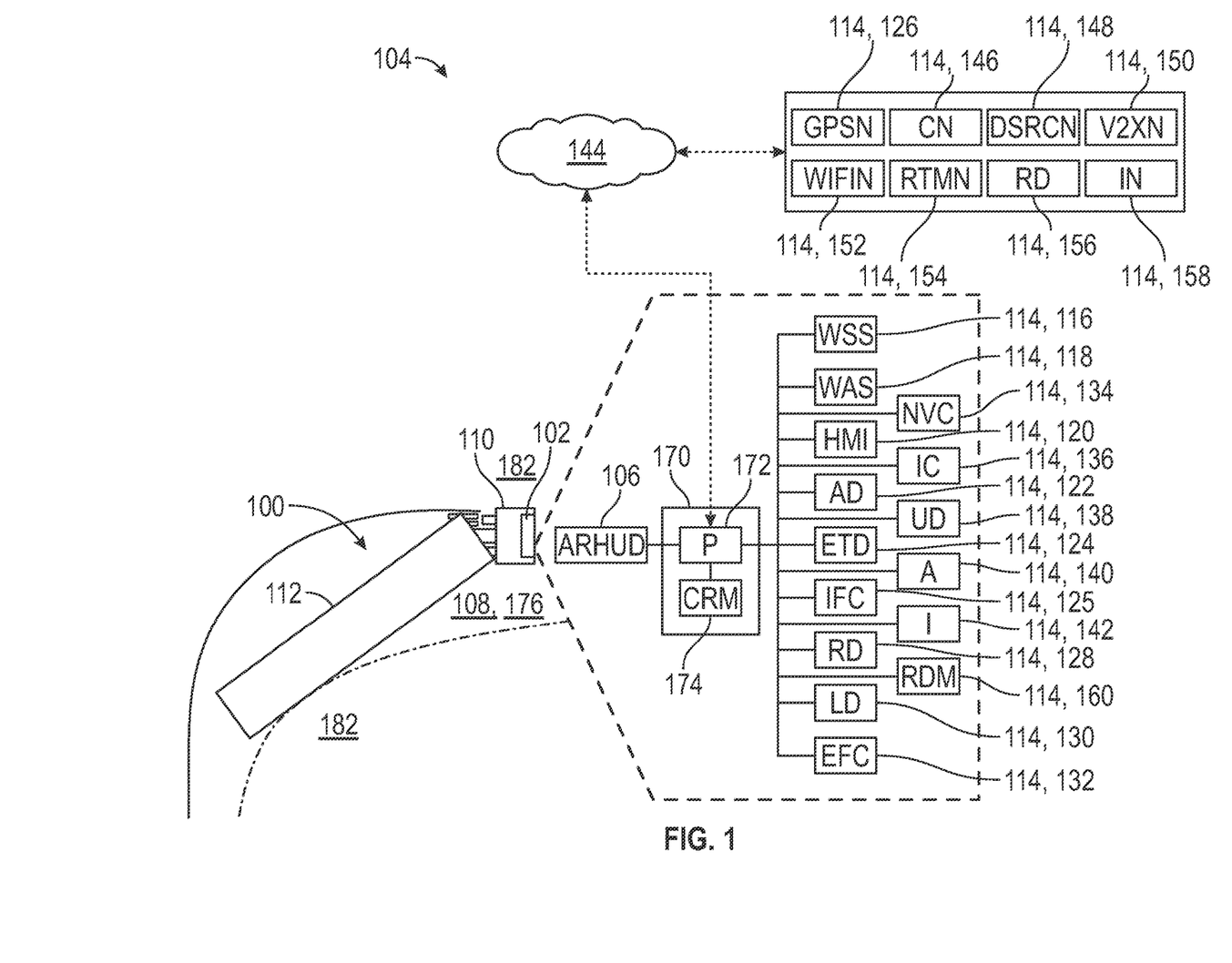
FIG. 1 is a schematic diagram of one example of a motor vehicle having a driving guidance system with an Augmented Reality Head Up Display (ARHUD) and a windshield for notifying a driver of a predicted trajectory and a recommended trajectory of the motor vehicle.

Referring to FIG. 1, one example of a motor vehicle 100 includes a windshield 102 and a driving guidance system 104 for determining a road geometry and a predicted trajectory of the motor vehicle 100 based on multiple real-time parameters of the motor vehicle 100 and the road geometry. The system 104 further determines a recommended trajectory and a recommended speed of the motor vehicle 100 based on the real-time parameters and the road geometry. As described in detail below, the system 104 includes an Augmented Reality Head Up Display (ARHUD) 106 for displaying multiple images onto the windshield 102 and overlaid onto the road geometry 108 to notify a driver of the motor vehicle 100 about the predicted trajectory, the recommended trajectory, and the recommended speed of the motor vehicle 100.

The motor vehicle 100 includes a towing vehicle 110 and a trailer 112, which is connected to the towing vehicle 110 and moved by the towing vehicle 110. Non-limiting examples of the towing vehicle 110 include a land vehicle, such as a sedan, a light duty truck, a heavy duty truck, a sport utility vehicle, a van, or a motor home. The motor vehicle 100 is an autonomous vehicle, a semi-autonomous vehicle, or a non-autonomous (manual) vehicle. Non-limiting examples of the trailer 112 can include a standard flatbed trailer, a horse trailer, a fifth-wheel RV trailer, a tractor trailer, a dry van trailer, a refrigerated trailer, a drop-deck/step-deck trailer, a double drop/lowboy trailer, a hotshot trailer, a Conestoga trailer, an extendable drop-deck trailer, or another vehicle. However, it is contemplated that the motor vehicles can include other suitable towing vehicles and towing vehicles. In still other non-limiting examples, the motor vehicle may not include a trailer.

The system 104 includes one or more input devices 114 for generating an input signal associated with movement of the motor vehicle 100. Non-limiting examples of the input device 114 can be on-board devices, such as a wheel speed sensor 116 for generating a speed signal indicative of a current speed of the motor vehicle 100 and a steering angle sensor 118 for generating a wheel signal indicative of a current wheel angle of the motor vehicle 100. The input devices 114 can further include a Human Machine Interface (HMI) 120 receiving data associated with a vehicle wheel base of the towing vehicle 110, a vehicle weight of the towing vehicle 110, a trailer wheel base of the trailer 112, and a trailer weight of the trailer 112. The input devices 114 can further include an activation device 122, and the activation device 122 generating an activation signal in response to the activation device 122 being operated by the driver. Non-limiting examples of the activation device can include a virtual radio button on a touchscreen HMI, a control arm on a steering wheel, and/or a voice-activated control mechanism. The input devices 114 can further include an eye tracker device 124 (e.g., internally-facing camera 125) generating a user signal associated with a location of an eye of the driver. The user signal includes driver perception data associated with the location of a head of the driver and the orientation or gaze location of the driver's eyes. It is to be appreciated that the driver eye and head positions are at a different location than the input devices 114 (e.g., cameras), and therefore there may be areas in the environment that the driver may view that are not captured by the image capturing devices, and vice versa. The input devices 114 can further include off-board devices, such as a GPS network 126 for generating a location signal indicative of a current location of the motor vehicle 100 and/or a route signal associated with a GPS route. The GPS route includes a road curvature.

Other non-limiting examples of input devices can include a radar device 128, a lidar device 130, an externally-facing camera 132, a night-vision camera 134, an infrared camera 136, an ultrasonic device 138, an accelerometer 140, and/or an inclinometer 142. Non-limiting examples of the input device 114 can wirelessly connect to one or more external data and communication networks 144, such as a cellular network 146, a dedicated short-range communications (DSRC) network 148, a vehicle-infrastructure (V2X) network 150, a Wi-Fi network 152, a road traffic monitoring network 154, a road database 156, and an Internet network 158. However, it is contemplated that the input device can include other suitable on-board devices or off-board devices.

The system 104 further includes a road detection module 160 for generating a road signal associated with a road geometry 108 that is visible through the windshield 102 and located within a field of view of the driver of the motor vehicle 100. The road geometry 108 includes a lane geometry, a roadside safety barrier, and/or a land elevation, such as an entrance ramp, an exit ramp, a merging lane, and/or an adjacent lane of traffic. It is contemplated that the road signal can be indicative of other suitable road geometries where the system determines a predicted trajectory of the motor vehicle 100. In this non-limiting example, the road detection module 160 can include the radar device 128, the lidar device 130, the externally-facing camera 132, the night-vision camera 134, the infrared camera 136, the ultrasonic device 138, the cellular network 146, the DSRC network 148, the V2X network 150, the Wi-Fi network 152, the road traffic monitoring network 154, the road database 156, the Internet network 158, and/or the GPS network 126.

Figure 2:
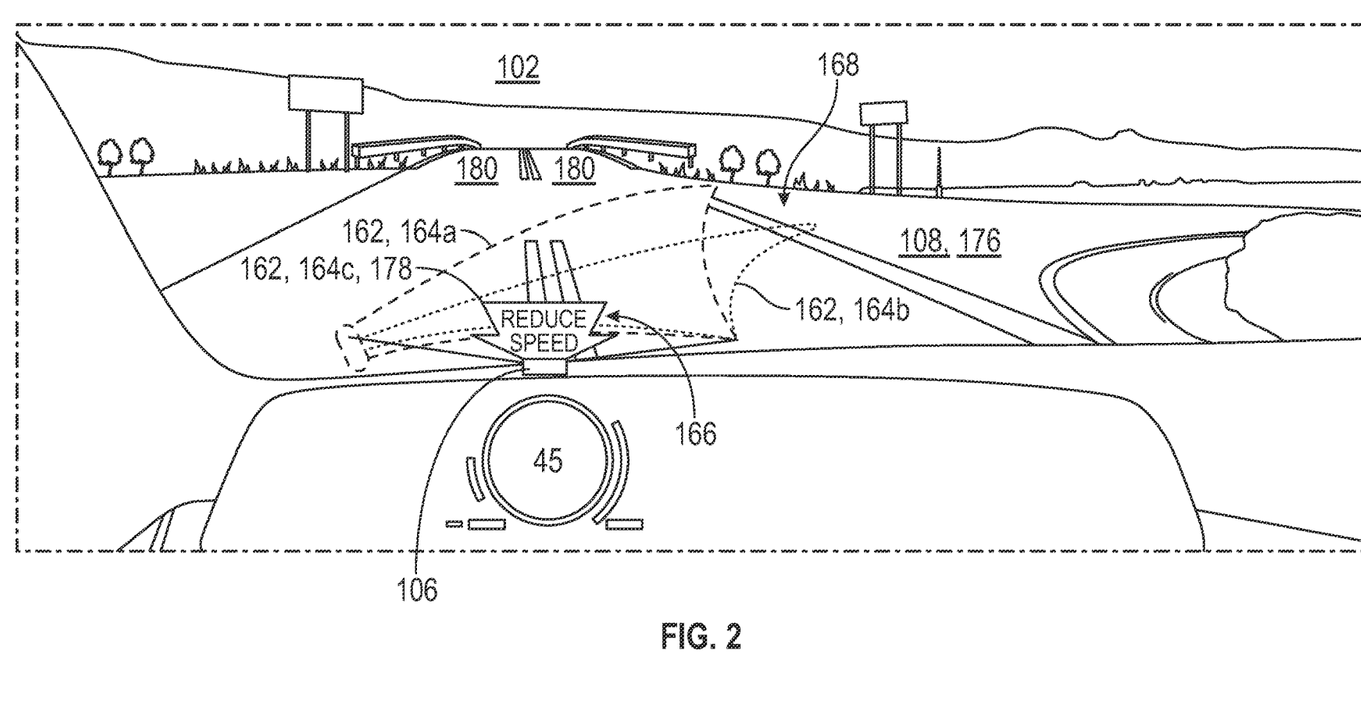
FIG. 2 is an exemplary interior view of the windshield of FIG. 1, where the environment surrounding the motor vehicle is visible through the windshield, which includes a first, near-field image plane and a second, far-field image plane.

Referring to FIG. 2, the system 104 further includes the Augmented Reality Head Up Display (ARHUD) 106 for generating the images 162, e.g., one or more notification symbols 164a, 164b, 164c, upon the windshield 102 and overlaid onto the road geometry 108. The ARHUD 106 displays information regarding the notification symbol 164c within a near-field image plane 166 and/or a far-field image plane 168 of the windshield 102. In this non-limiting example, as described in detail below, the ARHUD 106 projects the images 162, e.g., one or more notification symbols 164a, 164b on a portion of the far-field image plane 168 of the windshield 102 where the notification symbols 164a, 164b are overlaid onto the windshield 102 to notify the driver of the predicted trajectory of the motor vehicle 100 and the recommended trajectory of the motor vehicle 100. In addition, the ARHUD 106 is configured to project the recommended speed of the motor vehicle 100 on a portion of the near-field image plane 166 of the windshield 102 where the notification symbol 164c indicates, e.g., the recommended speed of the motor vehicle 100. However, it is contemplated that the ARHUD can display other symbols and/or information in any combination of the near-field image plane and far-field image plane.

The system 104 further includes a computer 170 having one or more processors 172 electrically communicating with the input devices 114, (e.g., the wheel speed sensor 116, the steering angle sensor 118, the HMI 120, the activation device 122, and the eye tracker device 124), the road detection module 160, and the ARHUD 106. The computer 170 further includes a non-transitory computer readable storage medium 174 (CRM) storing instructions, such that the processor 172 is programmed to receive the input signal from the input device 114 and the road signal from the road detection module 160. More specifically, continuing with the previous non-limiting example, the processor 172 is programmed to receive the speed signal from the wheel speed sensor 116, the wheel angle sensor 118 from the steering angle sensor 118, the location signal and the route signal from the GPS network 126, and the activation signal from the activation device 122, the user signal from the eye tracker device 124.

The processor 172 is further programmed to determine in real time the predicted trajectory of the motor vehicle 100 along the road geometry 108, in response to the processor 172 receiving the input signal from the input device 114 (e.g., the location signal from the GPS network 126, the speed signal from the wheel speed sensor 116 etc.) and/or the road signal from the road detection module 160. More specifically, in one non-limiting example, the processor 172 can be programmed to determine a road geometry, a lateral acceleration, and a braking distance, in response to the processor 172 receiving the input signal from the input device 114 (e.g., the location signal from the GPS network 126, the speed signal from the wheel speed sensor 116, the angle signal from the wheel angle sensor 118, etc.) and the road signal from the road detection module 160. The processor 172 is further programmed to determine the predicted trajectory based on the lateral acceleration, the road geometry, the braking distance of the motor vehicle 100, and/or the location of another vehicle on the road geometry 108. Also, in this non-limiting example, the processor 172 is further programmed determine the predicted trajectory based on the vehicle wheel base of the towing vehicle 110, the vehicle weight of the towing vehicle 110, the trailer wheel base of the trailer 112, and the trailer weight of the trailer 112. The processor 172 may be further programed to determine that the motor vehicle 100 is approaching the road curvature 176 and determine a predicted collision of the motor vehicle 100 at a predicted collision time, which is associated with the predicted trajectory and based on the location signal from the GPS network and/or data from the road database. This data can include the lane geometry, the roadside safety barrier, and the land elevation. In other non-limiting examples, the processor can determine the predicted trajectory of the motor vehicle 100 based on other suitable inputs.

The processor 172 is further programmed to determine in real time the recommended trajectory and the recommended speed of the motor vehicle 100 along the road geometry 108, in response to the processor 172 receiving the input signal from the input device 114 (e.g., the speed signal from the wheel speed sensor 116, the location signal and the route signal from the GPS network 126, etc.), and the road signal from the road detection module 160. More specifically, in one non-limiting example, the processor 172 is programmed to determine the recommended trajectory and the recommended speed based on the braking distance, the current speed of the motor vehicle 100, the current location of the motor vehicle 100, the road geometry 108 (e.g., the upcoming road curvature 176), the GPS route of the motor vehicle 100, a lateral acceleration rating of the towing vehicle 110 and/or the trailer 112, the vehicle wheel base of the towing vehicle 110, the vehicle weight of the towing vehicle 110, the trailer wheel base of the trailer 112, and the trailer weight of the trailer 112, the lane geometry, the roadside safety barrier, and the land elevation. In other non-limiting examples, the processor can determine the recommended trajectory and the recommended speed of the motor vehicle 100 based on other suitable inputs. The recommended trajectory and the predicted trajectory are separate from one another.

The processor 172 is further programmed to generate an actuation signal based on the predicted trajectory, the recommended trajectory, and the recommended speed of the motor vehicle 100, in response to one or more predetermined conditions. More specifically, in one non-limiting example, the processor 172 is programmed to generate the actuation signal based on the predicted trajectory, the recommended trajectory, and the recommended speed of the motor vehicle 100, in response to the activation device 122 being operated by the driver to generate an activation signal received by the processor 172. In one non-limiting example, the processor 172 is programmed to generate the actuation signal based on the predicted trajectory, the recommended trajectory, and the recommended speed of the motor vehicle 100, in response to the processor 172 determining that the motor vehicle 100 is approaching the road curvature 176 based on the route signal received from the GPS network 126. In another non-limiting example, the processor 172 is programmed to generate the actuation signal based on the predicted trajectory, the recommended trajectory, and the recommended speed of the motor vehicle 100, in response to the processor 172 determining that the current speed of the motor vehicle 100 is above a predetermined speed threshold associated with the braking distance of the motor vehicle 100, the road geometry, and the weight of the motor vehicle 100. In yet another non-limiting example, the processor 172 is programmed to generate the actuation signal based on the predicted trajectory, the recommended trajectory, and the recommended speed of the motor vehicle 100, in response to the processor 172 determining that the current wheel angle is above a predetermined angle threshold associated with the braking distance of the motor vehicle 100, the road geometry, and the weight of the motor vehicle. In still another non-limiting example, the processor 172 is programmed to generate the actuation signal based on the predicted trajectory, the recommended trajectory, and the recommended speed of the motor vehicle 100, in response to the processor 172 determining that a difference between the predicted geometry and the recommended trajectory is above a predetermined trajectory threshold.

The images 162 that are displayed on the windshield 102 may include the notification symbols 164a, 164b, 164c (FIG. 2), in response to the ARHUD 106 receiving the actuation signal from the processor 172. The ARHUD 106 projects the images 162 upon the windshield 102 and overlaid onto the road geometry 108 to notify the driver of the predicted trajectory, the recommended trajectory, and the recommended speed.

Referring to FIG. 2, the ARHUD 106 displays the images 162, such as the notification symbols 164a, 164b, 164c and/or information regarding the notification symbols 164a, 164b, 164c, within a first, near-field image plane 166 and/or a second, far-field image plane 168 of the windshield 102. In this non-limiting example, the ARHUD 106 projects first and second notification symbols 164a, 164b, in the form of respective lines or paths onto a portion of the far-field image plane 168 of the windshield 102 where the notification symbols 164a, 164b are overlaid onto the road geometries 108 that are associated with the predicted trajectory and the recommended trajectory and visible to the driver.

The ARHUD 106 is further configured to display information regarding a third notification symbol 164c (FIG. 2) within the near-field image plane 166 of the windshield 102. In this non-limiting example, the ARHUD 106 is configured to project the third notification symbol 164c in the form of a warning or driver instruction associated with the recommended trajectory. For example, where the recommended trajectory is positioned to the right of the predicted trajectory, the third notification symbol 164c instructs the driver to "Reduce Speed" and/or "Steer Right." Furthermore, where the recommended trajectory is positioned to the left of the predicted trajectory, the third notification symbol 164c instructs the driver to "Reduce Speed" and/or "Steer Left." It is contemplated that the ARHUD 106 can also be configured to project cluster content information 178 (FIG. 2) upon the windshield 102 within the near-field image plane 166. The cluster content information 178 informs the driver of the motor vehicle 100 of driving conditions, such as, but not limited to, vehicle speed, speed limit, gear position, fuel level, current position, and navigational instructions. Also, in this non-limiting example, the cluster content information 178 includes vehicle speed and navigational directions.

Figure 3:
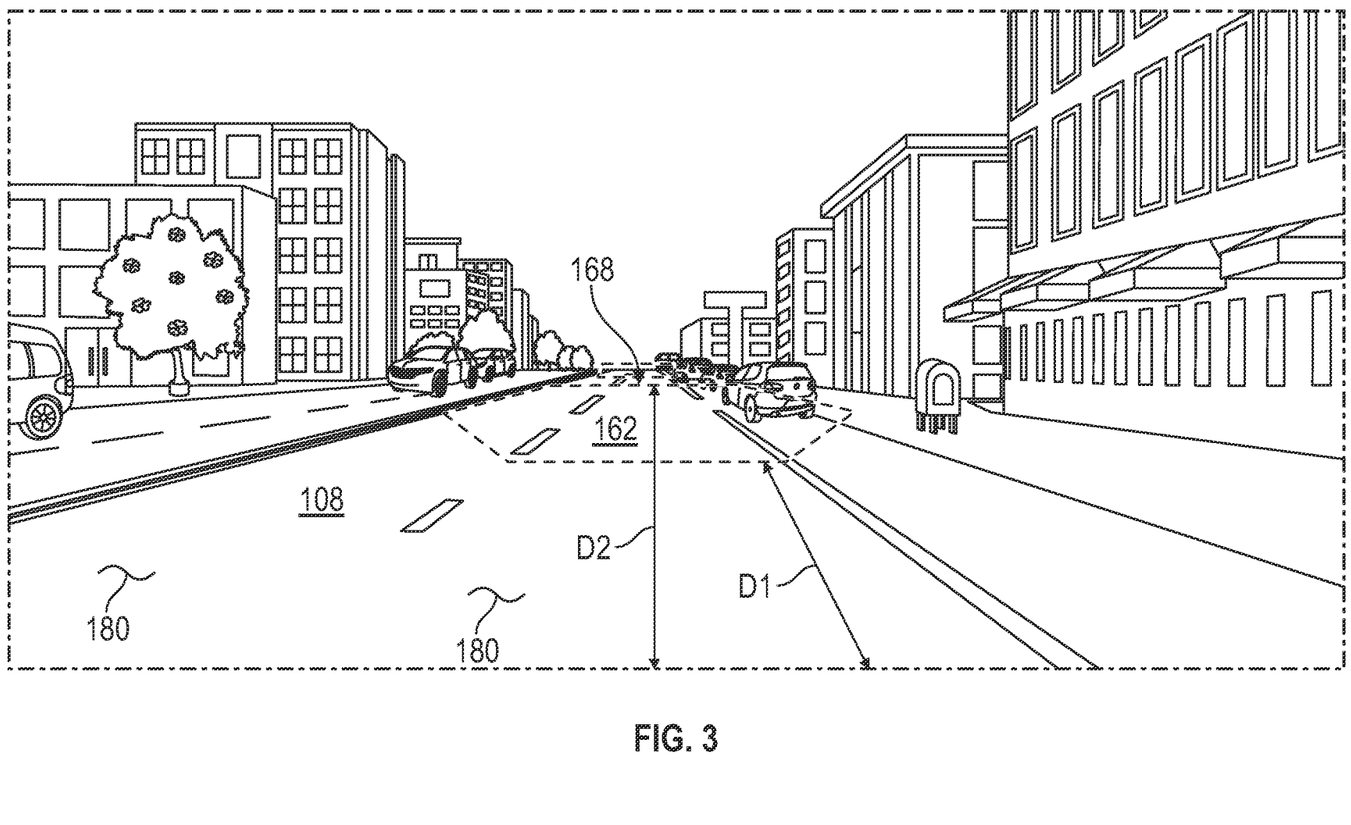
FIG. 3 is an exemplary view through the windshield of FIG. 1, where the ARHUD displays the second, far-field image plane appearing a predetermined distance from the motor vehicle and across multiple lanes of traffic.

Referring to FIG. 3, the far-field image plane 168 is overlaid onto the road geometry 108 extending from a minimum distance D1 from the motor vehicle to a maximum distance D2 from the motor vehicle 100, such that the notification symbols 164a, 164b on the far-field image plane 168 occludes one or more lanes 180 of traffic.

The far-field image plane 168 contains images overlaid upon the road geometry 108, e.g., the roadway, which is visible through the windshield 102. In the example shown in FIGS. 2 and 3, the far-field image plane 168 only covers a portion of the entire plane of the windshield 102. However, it is contemplated that the far-field image plane may cover the entire plane of the windshield 102 that is not occupied by the near-field image plane 166. Moreover, while FIG. 3 illustrates the far-field image plane spanning across each lane 180 across the road geometry 108, other examples of the far-field image plane 168 can span across only a portion of the lanes 180 that are part of the road geometry 108.

The notification symbols 164a, 164b have a color, a size, and/or a symbol associated with the predicted trajectory and/or the recommended trajectory. The images associated with the predicted trajectory comprise a first color, e.g., red, and the images associated with the recommended trajectory comprise a second color, e.g., blue, that is different from the first color. It is contemplated that the notification symbols can have any suitable color that distinguishes the predicted trajectory and the recommended trajectory from one another and from the surrounding environment.

The ARHUD 106 is further configured to determine a predicted collision with another vehicle, the curb, and/or the roadside safety barrier and generate the images 162 upon the windshield 102 at a predetermined amount of time before the predicted collision time. Furthermore, in response to the processor 172 determining that the predicted collision time is decreasing in real time, the ARHUD 106 projects the images 162 onto the windshield 102 such that at least one of: the color of the notification symbol incrementally increases in a brightness value; the color of the notification symbol incrementally increases in a saturation value; and/or the size of the notification symbol incrementally increases. As but one example, the ARHUD 106 can project the images upon the windshield 102 three to five seconds before the predicted time of collision, in response to the ARHUD 106 receiving the actuation signal from the processor 172. In another example, the ARHUD 106 can project the images on the windshield fewer than three seconds before the predicted time of collision to avoid false alarms when, for example, the processor 172 determines that the braking distance of the motor vehicle 100 is less than the current distance between the motor vehicle 100 and a predicted crash site portion 182. In still another example, the ARHUD 106 can project the images on the windshield more than five seconds before the predicted time of collision to provide more response time for the driver of the motor vehicle 100 when, for example, the processor 172 determines that the braking distance of the motor vehicle 100 is more than the current distance between the motor vehicle 100 and the predicted crash site portion 182.

Figure 4:
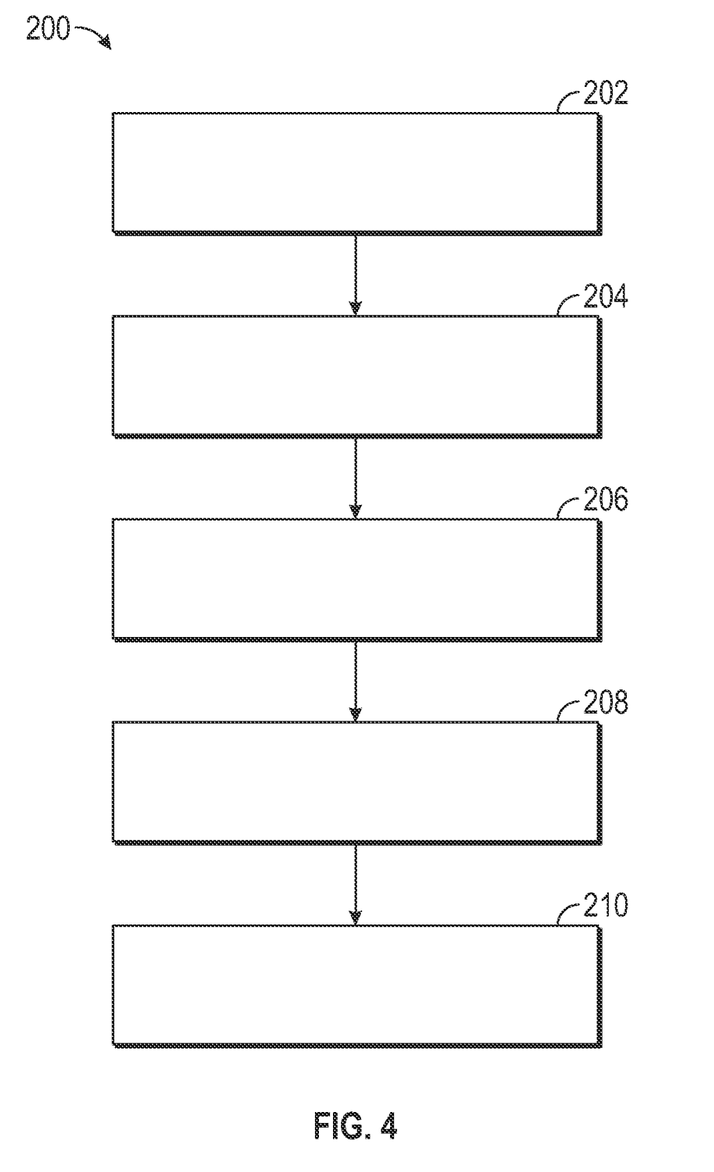
FIG. 4 is a flow chart of one example of a process for operating the driving guidance system of FIG. 1.

Referring to FIG. 4, a process 200 for operating the system 104 of FIG. 1 begins at block 202, with generating, using the input device 114, the input signal associated with the movement of the motor vehicle. The process 200 further includes generating, using the road detection module 160, the road signal associated with the road geometry that is visible through the windshield and located within a field of view of a driver of the motor vehicle.

At block 204, the process 200 further includes receiving, with the processor 172, the input signal from the input device 114 and the road signal from the road detection module 160.

At block 206, the process 200 includes determining, using the processor 172, a predicted trajectory and a recommended trajectory of the motor vehicle 100 along the road geometry based on the input signal and the road signal, with the recommended trajectory being separate from the predicted trajectory.

At block 208, the process 200 includes generating, using the processor 172, the actuation signal based on the predicted trajectory and the recommended trajectory of the motor vehicle 100.

At block 210, the process 200 includes generating, using the ARHUD 106, the images 162 (e.g., notification symbols 164a, 164b) upon the far-field image plane 168 of the windshield 102 and overlaid onto the road geometries 108 to notify the driver of the predicted trajectory and the recommended trajectory and the images 162 (e.g., notification symbol 164c) upon the near-field image plane 166 of the windshield 102, in response to the ARHUD 106 receiving the actuation signal from the processor 172.

The processors may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the processors may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A driving guidance system of a motor vehicle having a windshield, the driving guidance system comprising:

at least one input device for generating an input signal associated with a movement of the motor vehicle;

a road detection module for generating a road signal associated with a road geometry that is visible through the windshield and located within a field of view of a driver of the motor vehicle;

an Augmented Reality Head Up Display (ARHUD) for generating a plurality of images upon the windshield and overlaid onto the road geometry; and a computer including at least one processor electrically communicating with the at least one input device, the road detection module, and the ARHUD, where the computer further includes a non-transitory computer readable storage medium storing instructions such that the at least one processor is programmed to:

receive the input signal from the at least one input device and the road signal from the road detection module;

determine a predicted trajectory of the motor vehicle along the road geometry based on the input signal and the road signal;

determine a recommended trajectory of the motor vehicle along the road geometry based on the input signal and the road signal, with the recommended trajectory being separate from the predicted trajectory; and generate an actuation signal based on the predicted trajectory and the recommended trajectory of the motor vehicle; and wherein the ARHUD is configured to generate the plurality of images upon the windshield and overlaid onto the road geometry to notify the driver of the predicted trajectory and the recommended trajectory in response to the ARHUD receiving the actuation signal from the at least one processor; and wherein the at least one input device further includes a wheel speed sensor for generating a speed signal indicative of a current speed of the motor vehicle, and the at least one processor is further programmed to determine in real time the predicted trajectory of the motor vehicle in response to the at least one processor receiving the speed signal from the wheel speed sensor.

2. The driving guidance system of claim 1 wherein the at least one processor is further programmed to generate the actuation signal in response to at least one of:

the at least one input device including an activation device electrically communicating with the at least one processor, and the activation device being operated by the driver to generate an activation signal received by the at least one processor;

the at least one input device including a GPS network generating a route signal associated with a GPS route that includes a road curvature, and the at least one processor determining that the motor vehicle is approaching the road curvature; and the at least one processor determining that a difference between the predicted trajectory and the recommended trajectory is above a predetermined trajectory threshold.

3. The driving guidance system of claim 2 wherein the images associated with the predicted trajectory comprise a first color, and the images associated with the recommended trajectory comprise a second color that is different from the first color.

4. The driving guidance system of claim 2 wherein the at least one processor is further programmed to determine the predicted trajectory in response to the at least one processor determining that the current speed of the motor vehicle is above a predetermined speed threshold associated with a braking distance of the motor vehicle, the road geometry, and a weight of the motor vehicle.

5. The driving guidance system of claim 2 wherein the at least one input device further comprises a steering angle sensor for generating a wheel angle signal indicative of a current wheel angle of the motor vehicle, and the at least one processor is further programmed to determine in real time the predicted trajectory of the motor vehicle in response to the at least one processor receiving the wheel angle signal from the steering angle sensor.

6. The driving guidance system of claim 5 wherein the at least one processor is further programmed to determine the predicted trajectory in response to the at least one processor determining that the current wheel angle is above a predetermined angle threshold associated with a braking distance of the motor vehicle, the road geometry, and a weight of the motor vehicle.

7. The driving guidance system of claim 5 wherein the at least one input device further includes a GPS network for generating a location signal indicative of a current location of the motor vehicle, and the at least one processor determines the predicted trajectory, the recommended trajectory, and a recommended speed in response to the at least one processor receiving the location signal from the GPS network.

8. The driving guidance system of claim 7 wherein the at least one input device further comprises at least one of a road database, an externally-facing camera, a radar device, a lidar device, a night-vision camera, an infrared camera, an ultrasonic device, an accelerometer, an inclinometer, a V2X network, a Wi-Fi network, a DSRC network, a cellular network, an Internet network, and a Human Machine Interface (HMI), and the at least one processor further determines at least one of the predicted trajectory and the recommended trajectory in response to the at least one processor receiving the input signal from at least one of the road database, the externally-facing camera, the radar device, the lidar device, the night-vision camera, the infrared camera, the ultrasonic device, the accelerometer, the inclinometer, the V2X network, the Wi-Fi network, the DSRC network, the cellular network, the Internet network, and the HMI.

9. The driving guidance system of claim 8 wherein the at least one processor is further programed to:
  determine at least one of a lateral acceleration rating of the motor vehicle, a road geometry, and a braking distance in response to the at least one processor receiving the input signal from the at least one input device; and
  determine the recommended trajectory and the recommended speed based on at least one of a lateral acceleration rating of the motor vehicle, the road geometry, the braking distance, the current speed, the current location, and a location of another vehicle on the road geometry.

10. The driving guidance system of claim 9 wherein the road geometry comprises at least one of a lane geometry, a roadside safety barrier, and a land elevation, and the least one processor is further programed to determine a predicted collision of the motor vehicle at a predicted collision time associated with the predicted trajectory based on at least one of the lane geometry, the roadside safety barrier, and the land elevation.

11. The driving guidance system of claim 10 wherein the ARHUD is configured to generate the plurality of images upon the windshield at a predetermined amount of time before the predicted collision time.

12. The driving guidance system of claim 11 wherein the images include a notification symbol having at least one of a color, a size, and a symbol associated with an urgency level of the predicted collision.

13. The driving guidance system of claim 12 wherein, in response to the at least one processor determining that the predicted collision time is decreasing, the ARHUD projects the images onto the windshield such that at least one of:
  the color of the notification symbol incrementally increases in a brightness value;
  the color of the notification symbol incrementally increases in a saturation value; and
  the size of the notification symbol incrementally increases.

14. The driving guidance system of claim 12 wherein the images comprise a notification symbol, and the ARHUD is further configured to display information regarding the notification symbol within a near-field image plane of the windshield.

15. The driving guidance system of claim 14 further comprising an eye tracker electrically communicating with the at least one processor and generating a user signal associated with a location of an eye of the driver, such that the ARHUD projects the notification symbol on a portion of a far-field image plane of the windshield where the notification symbol is overlaid onto the road geometry that is visible to the driver.

16. A motor vehicle comprising:
  a towing vehicle having a windshield;
  a trailer connected to the towing vehicle and moved by the towing vehicle; and
  a driving guidance system comprising:
    at least one input device for generating an input signal associated with a movement of the motor vehicle;
    a road detection module for generating a road signal associated with a road geometry that is visible through the windshield and located within a field of view of a driver of the motor vehicle;
    an Augmented Reality Head Up Display (ARHUD) for generating a plurality of images upon the windshield and overlaid onto the road geometry; and
    a computer including at least one processor electrically communicating with the at least one input device, the road detection module, and the ARHUD, where the computer further includes a non-transitory computer readable storage medium storing instructions such that the at least one processor is programmed to:
      receive the input signal from the at least one input device and the road signal from the road detection module;
      determine a predicted trajectory of the motor vehicle along the road geometry based on the input signal and the road signal;
      determine a recommended trajectory of the motor vehicle along the road geometry based on the input signal and the road signal, with the recommended trajectory being separate from the predicted trajectory; and
      generate an actuation signal based on the predicted trajectory and the recommended trajectory of the motor vehicle; and
    wherein the ARHUD is configured to generate the plurality of images upon the windshield and overlaid onto the road geometry to notify the driver of the predicted trajectory and the recommended trajectory in response to the ARHUD receiving the actuation signal from the at least one processor; and
    wherein the at least one input device further includes a wheel speed sensor for generating a speed signal indicative of a current speed of the motor vehicle, and the at least one processor is further programmed to determine in real time the predicted trajectory of the motor vehicle in response to the at least one processor receiving the speed signal from the wheel speed sensor.

17. The motor vehicle of claim 16 wherein the at least one input device includes a Human Machine Interface (HMI) electrically connected to the at least one processor and receiving data associated with at least one of a vehicle wheel base of the towing vehicle, a vehicle weight of the towing vehicle, a trailer wheel base of the trailer, and a trailer weight of the trailer, and where the at least one processor is further programmed to at least one the predicted trajectory and the recommended trajectory based on the vehicle wheel base of the towing vehicle, the vehicle weight of the towing vehicle, the trailer wheel base of the trailer, and the trailer weight of the trailer.

18. A process of operating a driving guidance system of a motor vehicle having a windshield, the driving guidance system having at least one input device, a road detection module, an Augmented Reality Head Up Display (ARHUD), a computer including at least one processor and a non-transitory computer readable storage medium storing instructions, the process comprising:

generating, using the at least one input device, an input signal associated with a movement of the motor vehicle;

generating, using the road detection module, a road signal associated with a road geometry that is visible through the windshield and located within a field of view of a driver of the motor vehicle;

generating, using the ARHUD, a plurality of images upon the windshield and overlaid onto the road geometry;

receiving, with the at least one processor, the input signal from the at least one input device and the road signal from the road detection module;

determining, using the at least one processor, a predicted trajectory of the motor vehicle along the road geometry based on the input signal and the road signal;

determining, using the at least one processor, a recommended trajectory of the motor vehicle along the road geometry based on the input signal and the road signal, with the recommended trajectory being separate from the predicted trajectory;

generating, using the at least one processor, an actuation signal based on the predicted trajectory and the recommended trajectory of the motor vehicle; and     generating, using the ARHUD, the plurality of images upon the windshield and overlaid onto the road geometry to notify the driver of the predicted trajectory and the recommended trajectory in response to the ARHUD receiving the actuation signal from the at least one processor;

generating, using a wheel speed sensor, a speed signal indicative of a current speed of the motor vehicle; and     determining, using the at least one processor, in real time the predicted trajectory of the motor vehicle in response to the at least one processor receiving the speed signal from the wheel speed sensor.

19. The process of claim 18 further comprising displaying, using the ARHUD, information regarding a notification symbol within at least one of a near-field image plane and a far-field image plane of the windshield.

20. The motor vehicle of claim 16 wherein the at least one processor is further programmed to determine the predicted trajectory in response to the at least one processor determining that the current speed of the motor vehicle is above a predetermined speed threshold associated with a braking distance of the motor vehicle, the road geometry, and a weight of the motor vehicle.

* * * * *